No. 787,487. PATENTED APR. 18, 1905.
A. WILLMER.
INTERNAL COMBUSTION ENGINE.
APPLICATION FILED MAY 3, 1904.
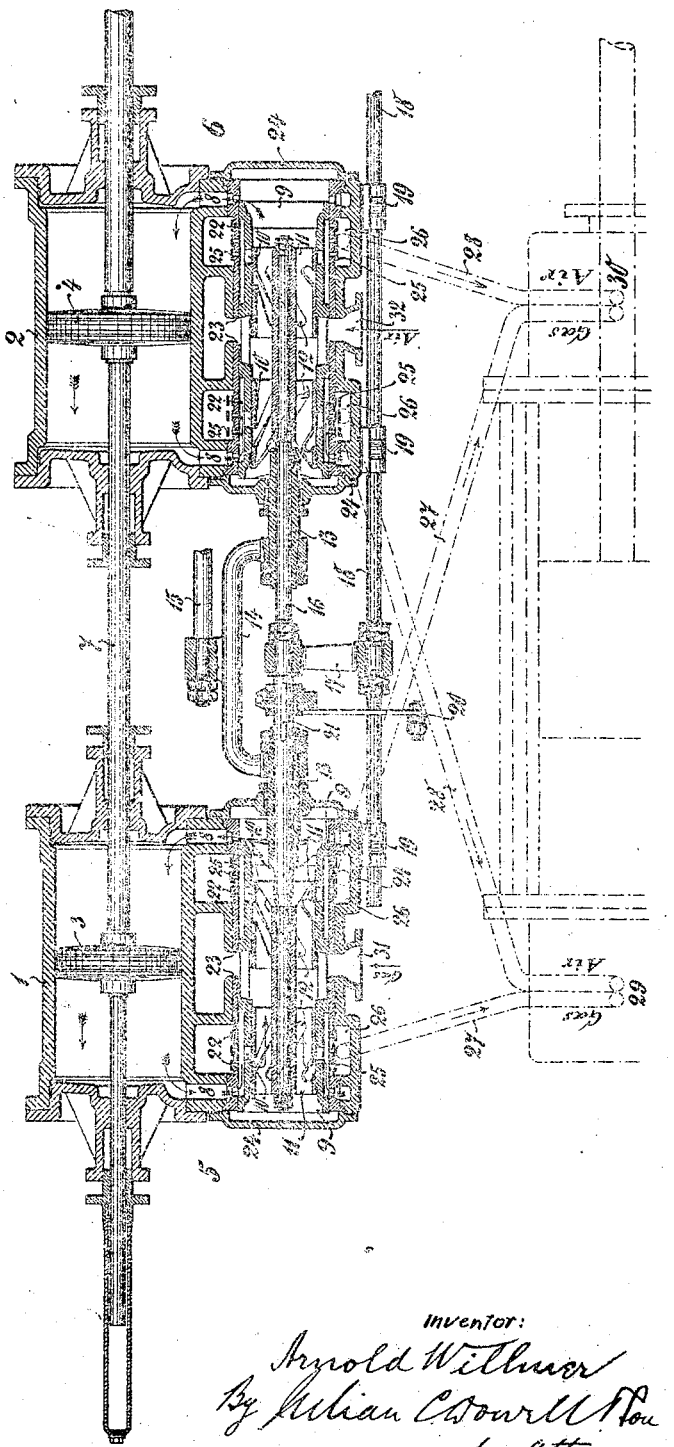

No. 787,487.

Patented April 18, 1905.

UNITED STATES PATENT OFFICE.

ARNOLD WILLMER, OF LINDEN, NEAR HANOVER, GERMANY.

INTERNAL-COMBUSTION ENGINE.

SPECIFICATION forming part of Letters Patent No. 787,487, dated April 18, 1905.

Application filed May 3, 1904. Serial No. 206,109.

*To all whom it may concern:*

Be it known that I, ARNOLD WILLMER, a subject of the King of Prussia, Emperor of Germany, whose post-office address is No. 9 Marktplatz, Linden, near Hanover, Prussia, German Empire, have invented a new and useful Improvement in Internal-Combustion Engines, of which the following is a specification.

This invention relates to internal-combustion engines having a two-stroke cycle in which the products of combustion are driven out of the cylinder by the entering charge of mixed gases. In order to prevent the premature ignition of the fresh mixture by the still hot products of combustion remaining behind, it is necessary to introduce a certain quantity of an indifferent gas, such as air, between the remnants of the products of combustion and the entering fresh charge. The charging is effected in such a way that first of all a certain quantity of air, which serves as a rinsing-gas, is introduced and then the combustible mixture of gas and air. In order to bring the efficiency of internal-combustion engines having a two-stroke cycle up to that of engines having a four-stroke cycle, it is of the greatest importance that the work done in supplying the new charge be as small as possible.

The present invention relates to an arrangement of pumps for the charging of the cylinder of an internal-combustion engine having a two-stroke cycle, this arrangement guaranteeing the employment of a minimum quantity of rinsing gas or air, which remains practically the same in amount for all loads and showing with decreasing loads a correspondingly smaller indicated consumption of work, not only as far as the gas-pump is concerned, but also in the case of the air-pump or pump for the rinsing-gas.

According to the present invention an internal-combustion engine having a two-stroke cycle is provided with a compression-pump for supplying rinsing-gas to the engine-cylinder and with a compression-pump for supplying combustible gas to said cylinder, the latter pump being adapted in the course of each cycle to begin to supply combustible gas later than the former pump begins to supply the rinsing-gas in order that the combustible gas may be preceded by a rinsing charge, connecting-pipes being arranged between said compression-pumps and the engine-cylinder and means being provided for automatically simultaneously causing a delay, corresponding to the decrease of the load, of the commencement of the compression periods of both of said compression-pumps in order that at all loads approximately the same rinsing charge may be supplied to the cylinder before the combustible charge.

In the accompanying drawings, which illustrate one embodiment of the present invention, by way of example, and the action of the same, Figure 1 is a sectional plan of a double-acting air-pump and a double-acting gas-pump arranged in tandem. Fig. 2 is an indicator diagram taken from the air-pump cylinder, the engine being under full load. Fig. 3 is an indicator diagram taken from the gas-pump cylinder, the engine being fully loaded. Fig. 4 is a diagram taken from the air-pump cylinder, the engine being less than fully loaded. Fig. 5 is a diagram taken from the gas-pump cylinder, the engine being at less than full load.

Referring to Fig. 1, 1 2 are the pump-cylinders of the gas and air compression pumps 5 6, respectively, 3 4 being the respective pistons working in said cylinders. The cylinders are arranged in tandem, the pistons 3 4 being connected together by the piston-rod 7. The diameters of the pistons correspond to the quantities of gas and air required in the charging mixture, so that when both pumps are working exactly the same mixture is always produced at the junction of the pressure-pipes leading from the pumps. The two pumps 5 6 are similarly constructed and are both double-acting. Each of the pumps is provided with inlet-ports 8 8, main inlet slide-valves 9 9 containing return-ports 10 10, supplementary return-valves 11 11 coöperating with said main inlet-valves to control said return-ports, which are arranged obliquely to the direction of travel of the valves 9 9. The valves 11 11 are provided with oblique ports 12 12, corresponding to the return-ports 10 10. The valves 9 9 of the two pumps are rigidly connected together by means of the hollow rods 13 13 and the junction-piece 14, with which the rod 15 is connected for driving the valves 9 9. As can be seen from the drawings, the valves 9 9 are in the form of hollow cylindrical valves, within which the return-valves 11 11 are fitted. These latter valves are also in the form of hollow cylinders, the valves of the two cylinders 1 2 being rigidly connected by the rod 16, which extends through the hollow rods 13 13 and which is provided with a cross-arm 17, secured to the rod 18, supported in bearings 19 19. The rod 18 serves for the operation of the valves 11 11. The rod 16 is also provided with the lever 20, keyed to the rod by means of the feather 21. The rod 16 can, however, slide longitudinally within the boss of the lever. In each pump 22 22 are delivery-ports passing through the liners 23 of the valve-chests 24. Said ports are controlled by the non-return delivery-valves 25 25, situated at the openings of the ports 22 into the delivery-chambers 26 26, from which the gas-livery pipes 27 27 and the air-pressure pipes 28 28 lead to the junctions 29 30. The gas and air are admitted through the openings 31 32, respectively. The valves 9 9 are constructed for full charging. The return-valves 11 11 nevertheless after the valves 9 9 have cut off the communication between the inlet-ports and the valve-chests when the pistons are at the dead-point according to their position allow during the pressure-stroke a return of the gases drawn in. On account of the oblique ports in the valves 11 11, if the valves be turned, an earlier or later cutting off of the return-current is brought about in a manner similar to the method used in the well-known Rider valve-gear. In the position of the pistons 3 4 shown in the drawings, which is approximately that occupied at the center of the stroke, and with the direction of motion being toward the left, the pistons are tending to compress the gas or air at the left-hand side and are drawing in gas or air at the right. The main slide-valves 9 9 have, consequently, on the left hand left free the connections with the delivery-chambers and on the right hand the connections with the supply-openings. The right-hand return-valve 11 of the gas-pump has, however, not cut off the return-current. Consequently the gas driven forward by the piston can pass back into the supply-space of the valve-chest, and the non-return delivery-valves 25 25, which can open into the delivery-chamber 26, remain closed, and consequently prevent the gas previously supplied to the pressure-pipe from flowing back. The left-hand return-valve 11 of the air-pump has just closed. Consequently the air compressed by the piston is driven past the non-return delivery-valves 25 into the pressure-pipe. The air-pump consequently supplies air; but the non-return delivery-valves 25 at the left-hand end of the gas-pump do not open, and gas is not supplied to the corresponding pressure-pipe until the return-valve 11 has cut off the return-current, after which air and gas are simultaneously supplied to the engine-cylinder. The turning or rotation of the return-valves 11 11 is effected by means of the engine-governor, which actuates the lever 20. A motion of the end of the lever upward out of the plane of the paper would effect a later cut off of the return-currents, and consequently involve a shorter time during which gas or air is supplied, which must occur on the engine becoming less heavily loaded.

Referring to Figs. 2 and 3, it will be seen that at full load the gas-pump does not begin to compress gas at the dead-point, but at the point $g$, Fig. 3, after a certain portion of the stroke has been passed over by the piston. During this time the air-pump alone works effectively, and the air supplied forms the necessary rinsing-air. $d\ c$, Fig. 2, represent the suction-line; $c\ b$, the compression-line up to the pressure in the pressure-pipe. At $b$ supply commences and lasts till $a$. $h\ i$, Fig. 3, represent the suction-line. While the line $i\ g$ is traversed a part of the gas drawn in is driven back into the supply-spaces. Then compression begins, and at $f$ the gas-pump commences to supply gas. During the portion of the piston-stroke corresponding to the interval between $b$ and $f$ air alone is supplied, which corresponds with the quantity of the necessary rinsing-air. Between $f$ and $e$ or $f$ and $a$ both pistons deliver simultaneously and produce the mixture of gas and air. When the combustion-engine is less heavily loaded, the governor so adjusts the valve-gear of the gas-pump that the supply becomes smaller in correspondence with the smaller consumption of gas, so that, consequently, the gas-pump begins to supply still later than was stated above for full load.

Referring to Fig. 5, which shows a gas-pump diagram for a light load, the delivery of gas first commences at $f'$. The valve-gear of the gas-pump is, however, connected with that of the air-pump in such a way that the air-pump also begins to deliver air later at a certain part of the stroke, as is evident from Fig. 4. It can be readily seen that the indicated work is reduced by the piece $b'\ c'\ c^2\ b^2$ and is considerably less than when the air-pump is not also governed and when, consequently, the same quantity is always supplied, an unnecessarily large quantity of rinsing-air thereby passing through the machine. Consequently according to this invention air is supplied only during the portion of the piston-stroke corresponding to the distance between $b'$ and $f'$, whereas otherwise it would be supplied during the portion corresponding to the distance between $b^2$ and $f'$. It will thus be observed that the present invention provides means for automatically producing, as the load decreases, during the initial period of the pressure-stroke of the pump supplying the rinsing-gas, a return of the rinsing-gas through the inlet port or ports of said pump and means for prolonging the initial period of the pressure-stroke of the pump supplying the combustible gas during which the combustible gas returns through the inlet port or ports of the pump in order that at all loads approximately the same rinsing charge may be supplied to the cylinder before the combustible charge.

It is of course to be understood that the scope of the present invention is not restricted to the particular embodiment illustrated in the drawings, but that the scope is as indicated by the claims.

What I claim is—

1. In an internal-combustion engine having a two-stroke cycle, the combination of a cylinder; a piston working therein; a compression-pump for supplying rinsing-gas to said cylinder; a compression-pump for supplying combustible gas to said cylinder, the latter pump being adapted in the course of each cycle to begin to supply combustible gas later than the former pump begins to supply the rinsing-gas, in order that the combustible gas may be preceded by a rinsing charge; connecting-pipes between said compression-pumps and the cylinder of the combustion-engine; and means for automatically simultaneously causing a delay, corresponding to the decrease of the load, of the commencement of the compression periods of both of said compression-pumps in order that at all loads approximately the same rinsing charge may be supplied to the cylinder before the combustible charge, essentially as and for the purpose stated.

2. In an internal-combustion engine having a two-stroke cycle, the combination of a cylinder; a piston working therein; a compression-pump for supplying rinsing-gas to said cylinder, said pump having a pump-cylinder, a piston working therein, one or more inlet-ports, an inlet-valve controlling the latter, one or more delivery-ports, and one or more delivery-valves controlling the latter; a compression-pump for supplying combustible gas to the cylinder of the combustion-engine, said pump having a pump-cylinder, a piston working therein, one or more inlet-ports, an inlet-valve controlling the latter, one or more delivery-ports, and one or more delivery-valves controlling the latter, the inlet-valve of the latter pump being arranged at the beginning of the pressure-stroke, while the engine is under full load, to allow a portion of the combustible gas to return through the inlet port or ports while the former pump is supplying rinsing-gas to the cylinder of the combustion-engine; connecting-pipes between said compression-pumps and the cylinder of the combustion-engine; and means for automatically simultaneously causing a delay, corresponding to the decrease of the load, of the commencement of the compression periods of both of said compression-pumps, in order that at all loads approximately the same rinsing charge may be supplied to the cylinder before the combustible charge, essentially as and for the purpose stated.

3. In an internal-combustion engine having a two-stroke cycle, the combination of a cylinder; a piston working therein; a compression-pump for supplying rinsing-gas to said cylinder; a compression-pump for supplying combustible gas to said cylinder, each of said pumps having a pump-cylinder, a piston working therein, one or more inlet-ports, an inlet-valve controlling the latter, one or more delivery-ports, and one or more delivery-valves controlling the latter, and the inlet-valve of the pump for supplying the combustible gas being so arranged at the beginning of the pressure-stroke, while the engine is under full load, as to allow a portion of the combustible gas to return through the inlet port or ports, while the pump for supplying the rinsing-gas is supplying rinsing-gas to the cylinder of the engine; and means for automatically producing, as the load decreases, during the initial period of the pressure-stroke of the pump supplying the rinsing-gas, a return of the rinsing-gas through the inlet port or ports of said pump and means for prolonging the initial period of the pressure-stroke of the pump supplying the combustible gas during which the combustible gas returns through the inlet port or ports of the pump, in order that at all loads approximately the same rinsing charge may be supplied to the cylinder before the combustible charge, essentially as and for the purpose stated.

4. In an internal-combustion engine having a two-stroke cycle, the combination of a cylinder; a piston working therein; a compression-pump for supplying rinsing-gas to said cylinder; a compression-pump for supplying combustible gas to said cylinder, each of said pumps having a pump-cylinder, a piston working therein, one or more inlet-ports, a main inlet-valve containing return-ports, and a supplementary return-valve coöperating with said main inlet-valve to control said return-ports, one or more delivery-ports, and one or more delivery-valves controlling the latter, and the inlet-valve of the pump for supplying the combustible gas being so arranged at the beginning of the pressure-stroke, while the engine is under full load, as to allow a portion of the combustible gas to return through the inlet port or ports, while the pump for supplying the rinsing-gas is supplying rinsing-gas to the cylinder of the engine; and means for automatically adjusting, as the load decreases, the supplementary return-valves in such a way that during the initial period of the pressure-stroke of the pump supplying the rinsing-gas, a return of the rinsing-gas through the inlet port or ports of said pump takes place, and so that the initial period of the pressure-stroke of the pump supplying the combustible gas during which the combustible gas returns through the inlet port or ports of the pump, is prolonged, in order that at all load approximately the same rinsing charge may be supplied to the cylinder before the combustible charge, essentially as and for the purpose stated.

5. In an internal-combustion engine having a two-stroke cycle, the combination of a cylinder; a piston working therein; a compression-pump for supplying rinsing-gas to said cylinder; a compression-pump for supplying combustible gas to said cylinder, each of said pumps having a pump-cylinder, a piston working therein, one or more inlet-ports, a main inlet slide-valve containing return-ports arranged obliquely to the direction of travel of the valve, an adjustable supplementary return-valve coöperating with said main inlet-valve to control said return-ports and having oblique ports corresponding to said return-ports, one or more delivery-ports, and one or more delivery-valves controlling the latter, and the inlet-valve of the pump for supplying the combustible gas being so arranged at the beginning of the pressure-stroke, while the engine is under full load, as to allow a portion of the combustible gas to return through the inlet port or ports, while the pump for supplying the rinsing-gas is supplying rinsing-gas to the cylinder of the engine; and means for automatically adjusting, as the load decreases, the supplementary return-valves transversely with regard to the line of travel of the main slide-valves, so that during the initial period of the pressure-stroke of the pump supplying the rinsing-gas, a return of the rinsing-gas through the inlet port or ports and the oblique return-ports in the main valve and the corresponding ports in the supplementary valve takes place, and so that the initial period of the pressure-stroke of the pump supplying the combustible gas during which the combustible gas returns through the inlet port or ports of the pump, is prolonged, in order that at all loads approximately the same rinsing charge may be supplied to the cylinder before the combustible charge, essentially as and for the purpose stated.

6. In an internal-combustion engine having a two-stroke cycle, the combination of a cylinder; a piston working therein; a compression-pump for supplying rinsing-gas to said cylinder; a compression-pump for supplying combustible gas to said cylinder; each of said pumps having a pump-cylinder, a piston working therein, one or more inlet-ports, a main inlet slide-valve 9 containing oblique return-ports 10, an adjustable supplementary return-valve 11 having oblique ports 12 corresponding to the ports 10, both of these valves being cylindrical and the valve 11 being arranged within the valve 10 and coöperating with said valve to control the return-ports 10, one or more delivery-ports 22, and one or more delivery-valves 25 controlling the latter, and the inlet-valve of the pump for supplying the combustible gas being so arranged at the beginning of the pressure-stroke, while the engine is under full load, as to allow a portion of the combustible gas to return through the inlet port or ports, while the pump for supplying the rinsing-gas is supplying rinsing-gas to the cylinder of the engine; and means for automatically turning the valve 11 within the valve 9, so that, as the load decreases, during the initial period of the pressure-stroke of the pump supplying the rinsing-gas, a return of the rinsing-gas through the inlet port or ports and the ports 10 in the valve 9 and the ports 12 in the valve 11 takes place, and so that the initial period of the pressure-stroke of the pump supplying the combustible gas during which the combustible gas returns through the inlet port or ports of the pump, is prolonged, in order that at all loads approximately the same rinsing charge may be supplied to the cylinder before the combustible charge, essentially as and for the purpose stated.

In testimony whereof I have hereunto set my hand in presence of two subscribing witnesses.

ARNOLD WILLMER.

Witnesses:
H. HALL HALL,
LEONORE RASCH.